(12) United States Patent
Kawashima et al.

(10) Patent No.: US 6,826,545 B2
(45) Date of Patent: *Nov. 30, 2004

(54) METHOD FOR SETTLING ACCOUNTS AMONG A PLURALITY OF PARTICIPANTS

(75) Inventors: Seigo Kawashima, Tokyo (JP); Hirotaka Kuroiwa, Tokyo (JP)

(73) Assignee: NEC Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 216 days.

(21) Appl. No.: 09/335,682

(22) Filed: Jun. 18, 1999

(65) Prior Publication Data

US 2002/0188560 A1 Dec. 12, 2002

(30) Foreign Application Priority Data

Jun. 18, 1998 (JP) .......................................... 10-170782
Jun. 18, 1998 (JP) .......................................... 10-171472
Jun. 18, 1998 (JP) .......................................... 10-171754

(51) Int. Cl.$^7$ .............................................. G06F 17/60
(52) U.S. Cl. ........................................ 705/40; 705/39
(58) Field of Search ............................. 705/40, 35, 39

(56) References Cited

U.S. PATENT DOCUMENTS 5,978,485 A * 11/1999 Rosen ........................... 380/49
6,049,787 A *  4/2000 Takahashi et al. ............. 705/44
6,076,074 A *  6/2000 Cotton et al. .................. 705/40

FOREIGN PATENT DOCUMENTS

JP         2000076369 A  *  3/2000  ........... G06F/19/00

WO         WO 97/19427    *  5/1997

OTHER PUBLICATIONS

Emmons, William R, "Recent developments in wholesale payment systems", Review –Federal Reserve Bank of St. Louis; St. Louis; Nov./Dec. 1997, vol. 79, issue 6, pp 23–43, Nov./Dec. 1997 [online]; [retrieved online May 23, 2001].*

Shen, Pu, "Settlement risk in large–value payments systems", Economic Review–Federal Reserve Bank of Kansas City: Second Quarter 1997, vol. 82, Issue 2, pp 45–62, online; [retrieved online May 23, 2001] URL:http//proquest.umi.com.*

(List continued on next page.)

Primary Examiner—Jeffrey A. Smith
Assistant Examiner—Yogesh C Garg
(74) Attorney, Agent, or Firm—Foley & Lardner LLP (57) ABSTRACT

A netting service provider determines, on the basis of payment information from netting service participants, the value of security each of the participants is required to deposit. The netting service participants determine the sums to be settled by multilateral setoffs within the extent of the values of the respective securities, and deliver the settlement sums to one another. However, any payment the inclusion of which would cause the settlement sum to exceed the value of the security is made subject to determination by a bilateral setoff, and the sums so settled are delivered between the participants concerned. Further, in order to demonstrate the legitimacy of payment information which is denied by both the buyer and the seller who are netting service participants, payment information is counterchecked by an electronic notarial institution. In addition, netting service participants are divided into groups according to creditability and other criteria to thereby prevent the insolvency of any one netting service participant from affecting all the participants in the netting service.

2 Claims, 9 Drawing Sheets

OTHER PUBLICATIONS

Patrikis, Ernest T, et al., "Q'est–Ce Que C'est "Netting"? Online of Bank Supervisory Netting Issues", Federal Reserve bank of New York–News &Events, pp 1–16, Sep. 25, 1996.*

Kantrow, Yvette D., "Greenspan asks Central Banks To Regulate Global Payments Series:3", American Banker, New york,N.Y., vol. 154, No. 113, p. 2, Jun. 12, 1989, [online]; [retrieved online May 23, 2001] URL:http//proquest.umi.com.*

Anonymous, "FXNET and Multinest set up multilateral netting system", Wall Street & Technology; vol. 14,issue 3, pp 18, Mar. 1996, [online]; [retrieved online May 23, 2001] URL:http//proquest.umi.com.*

"Fed Won't Subject ACH to multilateral Netting Policy", Corporate EFT Report, vol. 15, n1, pN/A, Jan. 25, 1995, pp 1–3., retrieved from Dialog ® File 636.*

The Hitachi Review, Japan, Hitachi Hyoron sha, Jan. 1, 1998, vol. 80, No. 1, pp. 14–19.

Asahiko Isobe/Keven J. [Carney], "Electronic Settlements and the Financial Revolution," Japan, Tokyo Keizai Shimbunsha, Apr. 10, 1997, pp. 113–116.

Hikaru Yao, "International transactions and Electrtonic Settlements, " Japan, Tokyo Keizai Joho Shuppan, Jan. 26, 1997, pp. 9–11 and pp. 140–147.

"New York Ach Develops Global Financial EDI System would provide for real–time finality [sic]," EDI News, USA, Mar. 16, 1998, vol. 12, Issue 6.

* cited by examiner

| BUYER | SELLER | PAYMENT DAY | SUM(¥0,000) | UNIQUE KEY |
|-------|--------|-------------|-------------|------------|
| A | B | X | 10 | AX1 |
| A | C | X | 120 | AX2 |
| B | D | X | 50 | BX1 |
| D | B | X | 100 | DX1 |
| C | D | X | 30 | CX1 |

TO BE MADE UNIQUE IN THE WHOLE NETTING SERVICE.

EXAMPLE;
A=NAME OF BUYER
X=PAYMENT DAY
1~=SERIAL NUMBER

Fig. 10

METHOD FOR SETTLING ACCOUNTS AMONG A PLURALITY OF PARTICIPANTS

BACKGROUND OF THE INVENTION

1. Field of the Invention

The present invention relates to a method for settling accounts among a plurality of participants, and more particularly to a method for settling accounts among a plurality of participants by multilaterally or bilaterally setting off sums payable by each participant to others with sums receivable by each participant from others.

2. Description of the Related Art

Along with the diversification of commercial transactions in recent years, there is a growing need for quicker settlement of increasingly complex credits and debits among a plurality of companies.

Figure 9:
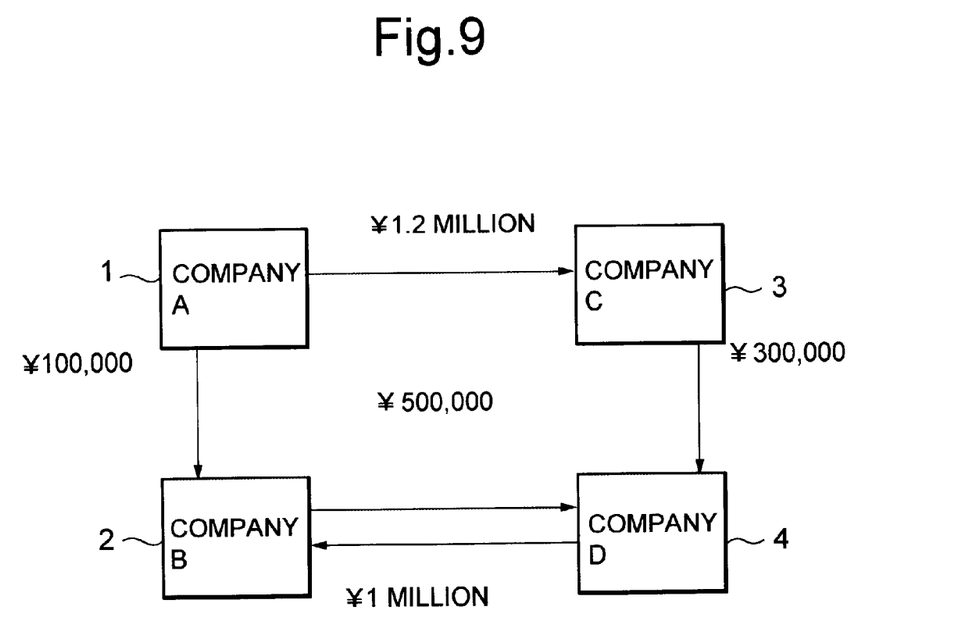
FIG. 9 is a diagram illustrating an example of payment relations among companies, to be referred to in describing the prior art.

Supposing that, for instance, relations illustrated in FIG. 9 exist between A Company 1 and B Company 2, between A Company 1 and C Company 3, between C Company 3 and D Company 4, and between B Company 2 and D Company 4. Thus, A Company 1 owes ¥1.2 million to C Company 3, C Company 3 owes ¥300,000 to D Company 4, and D Company 4 owes ¥1 million to B Company 2, while B Company 2 owes ¥500,000 D Company 4 and A Company owes ¥100,000 to B Company 2, each payable by a prescribed day.

Settlement methods applicable to such a situation include one based on multilateral setoffs. A "multilateral setoff" means a procedure of account settlement by which a company whose payables to other companies exceed the receivables from others pays the excess payables to a third party institution and another whose receivables from other companies exceed the payables to others receive from the third party institution the excess receivables. Thus, where the payment relations shown in FIG. 9 exists, a multilateral setoff arrangement enables the accounts involved to be settled, as illustrated in FIG. 10, by having A Company 1 pay ¥1.3 million and D Company 4 pay ¥200,000 to an institution 5, represented by a circle, and B Company 2 receive ¥600,000 and C company 3 receive ¥900,000 from the institution 9.

However, this settlement system based on a multilateral setoff arrangement involves the problem that, once any one company goes insolvent, the account settlements of not only the companies directly dealing with the insolvent but also all the other participants in the system, even if they have no direct transactions with the insolvent, are prevented from having their accounts settled in time.

Suppose, for instance, A Company 1 runs into a circumstance under which it cannot pay ¥1.2 million to C Company 3 by the due date. In such a case, if C Company 3 planned to pay ¥300,000 to D Company 4 after receiving the ¥1.2 million from A Company 1, C Company 3 will become unable to pay the ¥300,000 to D Company 4. Or if D Company 4 planned to add, after receiving the ¥300,000 from C Company 3, its own fund of ¥200,000 to the received sum and pay ¥500,000 (the balance between the ¥1 million payable to B Company 2 and the ¥500,000 receivable from the same), D Company 4 will also become unable to pay the ¥500,000 to B Company 2 because C Company 3 has run into a circumstance that it cannot pay the 300,000 to D Company 4.

Figure 10:
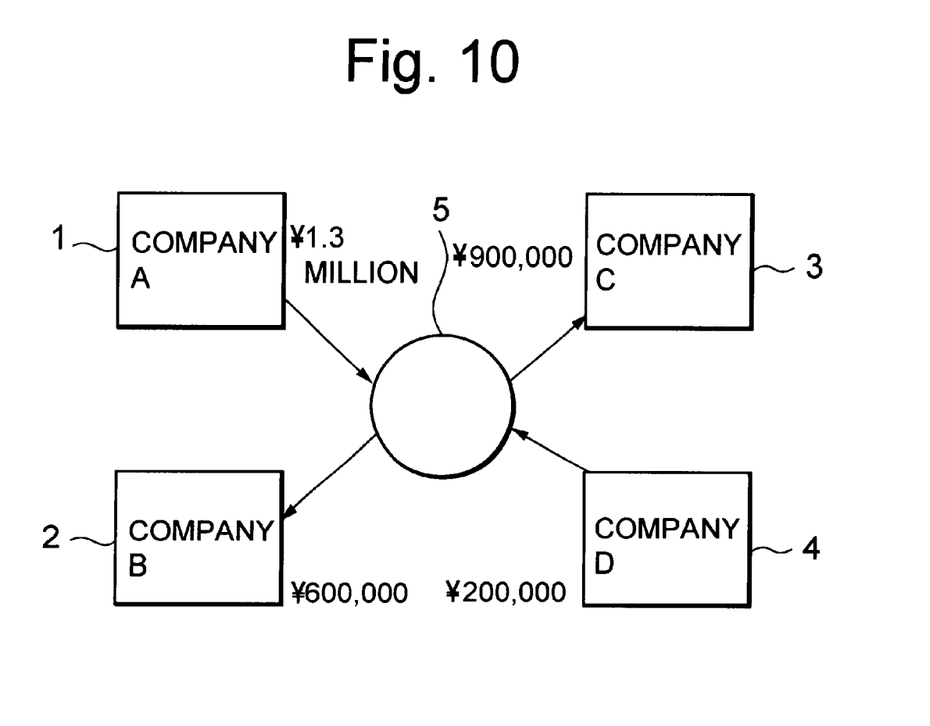
FIG. 10 is a diagram illustrating shifts of payable sums after multilateral setoffs, to be referred to in describing the prior art.

To describe this situation with reference to FIG. 10, although the sums payable to the institution 5 are ¥100,000 due from A Company 1 and ¥200,000 from D Company 4, those payable from the institution 5 are ¥600,000 due to B Company 2 and ¥900,000 to C Company 3, resulting in an imbalance between payables and receivables.

Even if the liability of A Company 1 to pay ¥1.2 million to C Company 3 is excluded from this multilateral setoff and the sums to be settled are recalculated, C Company 3, which would otherwise receive ¥900,000, will conversely have to pay ¥300,000, and find it very difficult to raise that fund by the due date. This alternative again is unable to solve the problem of disturbing the account settlements among the companies involved.

Moreover, there is another problem that, in spite of the absence of direct transaction between D Company 4 and A Company 1, the insolvency of A Company 1 drives D Company 4 itself into insolvency. In addition, though the insolvency of D Company 4 is due to the insolvency of C Company 3, which in turn is a consequence of the insolvency of A Company 1, making it difficult for D Company 4 to urge C Company 3 to fulfill its obligation. Thus, there is the problem that chain reactions of corporate bankruptcies may arise with the ascription of responsibility remaining ambiguous.

Therefore, to avoid such a situation in a multilateral setoff arrangement and to settle all the accounts on the due date, the prior art offered no other alternative than to allow only reasonably creditworthy companies to participate in the settlement system.

To solve the problem of the ambiguous ascription of responsibility for the blockage of account settlements among all the participating companies by the insolvency of only one of them, a conceivable alternative is a bilateral setoff arrangement under which each participating company settles accounts with only those other participants with whom it has direct transactions. However, where accounts are settled on the basis of bilateral setoffs, the sums set off may become smaller than those set off multilaterally. Where there are accounts to be settled as shown in FIG. 9, if for instance C Company 3 is to settle its accounts on the basis of bilateral setoffs, it has to receive ¥1.2 million from A Company 1 and pay ¥300,000 to D Company 4, but under a multilateral setoff arrangement, it has only to receive ¥900,000 from the institution 5. In these compared cases, the ¥300,000 set off multilaterally cannot be set off bilaterally, resulting in the problem that settlements by bilateral setoffs are less efficient than settlements by multilateral setoffs.

SUMMARY OF THE INVENTION

An object of the present invention is to provide a method for account settlement among a plurality of companies differing in creditability, by which insolvency of any participating company can be prevented from affecting all the others and the ascription of responsibility among the participating companies can be clearly defined while maintaining the efficiency of settlement based on the results of multilateral setoffs.

According to one aspect of the invention, there is provided a method for settling accounts among a plurality of participants, comprising:

receiving a security from each of the plurality of participants;

determining the sum to be settled by each of the plurality of participants, within the value of the securities received, by multilateral setoffs;

paying the sum due to each participant who has a net receivable sum as a result of the foregoing determination;

determining the sums to be settled by the participant, whose payables to the other participant, if included in multilateral setoffs, would make the total sum to be settled exceed the value of the securities and therefore should not be included therein, by bilateral setoffs; and paying the settled sums among the participants concerned in accordance with this determination.

According to another aspect of the invention, there is provided a method further comprising:

receiving, in advance of the determination of the sum to be settled by multilateral setoffs, payment information indicating which of the plurality of participants is to pay how much to whom and when;

determining, in response to an inquiry by any of the plurality of participants, the value of the security this particular participant is to furnish on the basis of the payment information; and notifying the participant of this determined value of security.

According to still another aspect of the invention, there is provided a method wherein:

the payment information is received from a buyer out of the plurality of participants, and processing is done on the basis of the payment information only when the legitimacy of the payment information is confirmed by an electronic notarial institution.

According to still another aspect of the invention, there is provided a method wherein:

only such payment information as has been confirmed to be legitimate by an electronic notarial institution is received from the electronic notarial institution, and processing is done on the basis of that payment information.

According to still another aspect of the invention, there is provided a method further comprising:

dividing the plurality of participants into a plurality of groups;

setting for each of the plurality of groups as the netting system one of the patterns: (A) having no host, (B) having a host and extra-group bilateral setoffs, and (C) having a host but no extra-group bilateral setoff; wherein:

no setoff is made for a group, for which (A) is set as the netting system, between any participant in the group and any participant outside the group; the sums to be settled are determined by bilateral setoffs for a group, for which (B) is set as the netting system, between participants in the group and participants outside the group; and the sum to be paid by each participant is determined as it is to be the sum to be settled for a group, for which (C) is set as the netting system, between the participant in the group and any participant outside the group; and processing to receive securities from the plurality of participants, processing to determine by multilateral setoffs the sums to be settled, processing to determine by bilateral setoffs the sums to be settled, and processing to deliver the sums to be settled are carried out only within each of the plurality of groups.

BRIEF DESCRIPTION OF THE DRAWINGS

Other features and advantages of the present invention will become apparent from the detailed description hereunder when taken in conjunction with the accompanying drawings, wherein.

DETAILED DESCRIPTION OF THE PREFERRED EMBODIMENTS

First Preferred Embodiment

A first preferred embodiment of the present invention will be described below with reference to accompanying drawings.

Specific description of this embodiment will presuppose the existence of payment relations among the four parties, A Company 1 to D Company 4. In the following description, setting off will be referred to as "netting," and a service to process account settlements on the basis of the results of setting off through a network, as a "netting service." As illustrated in FIG. 10, A Company 1 to D Company 4 are participants in a "netting service" and accordingly will be referred to as "netting service participants," and the institution 5 represented by a circle, which is an institution providing a "netting service," as a "netting service provider."

Incidentally, the specific items of hardware provided for the parties to the network of FIG. 10 include terminal units such as personal computers for A Company 1 to D Company 4, a server computer for the netting service provider 5, and communication lines, such as those of LAN and Internet, linking each participant to the netting service provider.

Though not shown in FIG. 10, in the processing of account settlements, a financial institution provides means of fund transfers to the participants in the netting service and the netting service provider 5.

Now will be described processing in this first embodiment with reference to FIG. 1.

Figure 1:
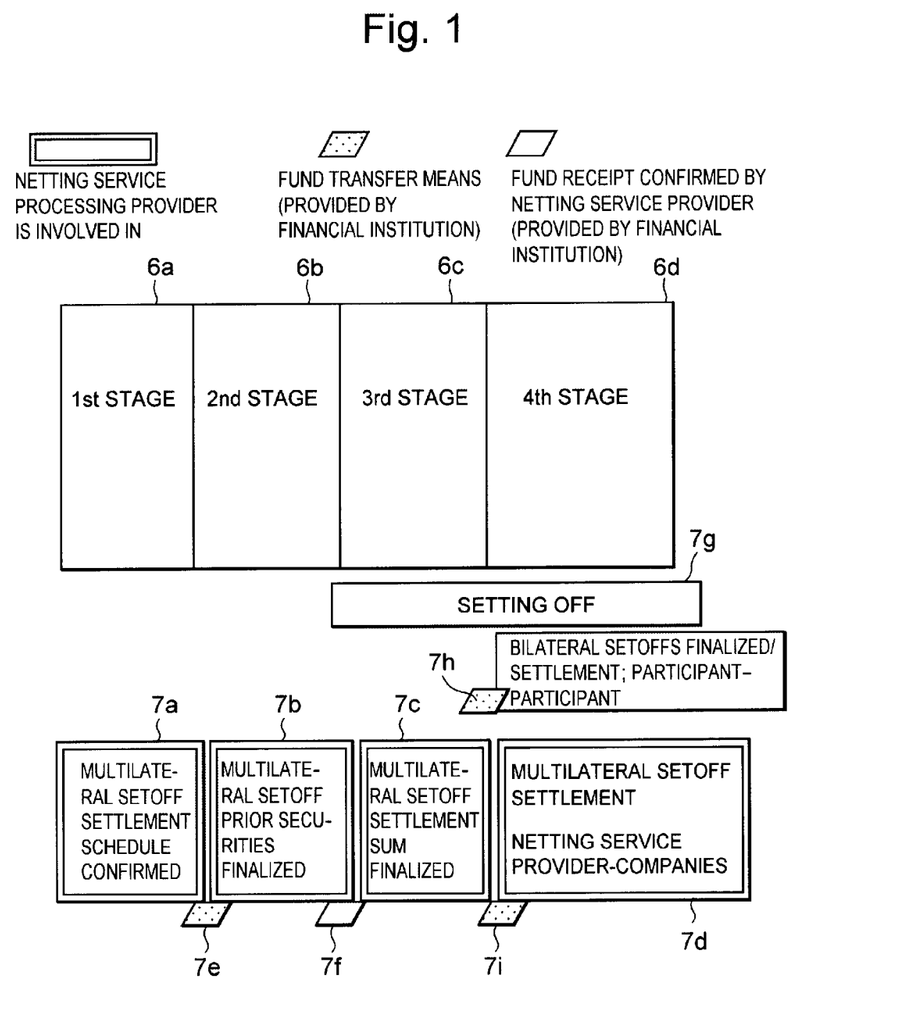
FIG. 1 is a diagram illustrating the flow of processing in a first preferred embodiment of the invention.

Referring to FIG. 1, processing in this embodiment consists of a first stage 6a to confirm the value of each security, a second stage 6b to furnish securities, a third step 6c to finalize the sums to be settled by multilateral setoffs, and a fourth stage 6d to pay each of the companies, among the netting service participants, the sum due thereto as finalized at the foregoing stage.

FIG. 1 also shows, as procedures in which the netting service provider 5 is concerned, a procedure 7a to confirm the settlement schedule, a procedure 7b for each netting service participant to deliver the required security to the netting service provider, a procedure 7c to finalize the sums to be settled by multilateral setoffs, and a procedure 7d for the netting service provider to deliver to each netting service participant the sum due thereto as finalized by the foregoing procedure. Procedures in which the fund transfer means provided by the financial institution has a part to perform comprise a procedure 7e for the part between the first and second stages 6a and 6b, and procedures 7h and 7i for the part between the third and fourth stages 6c and 6d, while the netting service provider confirms fund receipt information provided by the financial institution in the procedure 7f between the second and third stages 6b and 6c.

Procedures in the first through fourth stages 6a through 6d of this first embodiment will be described below sequentially.

First, before starting the procedure of the first stage 6a, the participants in the netting service including A Company 1, B Company 2, C Company 3 and D Company 4 provide payment information over communication lines to the netting service provider 5.

This payment information includes at least (1) the buyer, (2) the seller, (3) the payment day and (4) the sum. Here is supposed that the following sets of payment information are supplied to the netting service provider 5.

Buyer A, seller B, payment day X, sum ¥100,000
Buyer A, seller C, payment day X, sum ¥1.2 million
Buyer B, seller D, payment day X, sum ¥500,000
Buyer D, seller B, payment day X, sum ¥1 million
Buyer C, seller D, payment day X, ¥300,000

All these sets of payment information are provided in advance of the processing of setoffs.

In the present context, a "buyer" is a party who has an obligation to pay a certain sum to a certain seller on a certain payment day, and a "seller" is a party who is in a position to be paid a certain sum on a certain payment day by a certain buyer. In FIG. 9, A Company 1 to D Company 4 function as "buyers" and "sellers."

Such payment information having been provided, the first stage 6a is processed. The processing of the first stage 6a is to confirm the values of securities to be furnished to the netting service provider 5.

First, the netting service participants including A Company 1, B Company 2, C Company 3 and D Company 4 inquire the values of required securities of the netting service provider 5. In response, the netting service provider 5 performs simulation of multilateral setoffs and calculates the values of required securities so that the scheduled sums to be settled by A Company 1, B Company 2, C Company 3 and D Company 4 be within the previously registered securable limits, and supplies the results of calculation to the netting service participants A Company 1, B Company 2, C Company 3 and D Company 4 over communication lines (7a). The "previously registered securable limit" here means that the maximum sum securable by each company, set in advance according to its means. For instance, if the securable limit of A Company 1 is ¥2 million, the scheduled sum to be settled for the company as a result of multilateral setoffs will be ¥1.3 million to its debit, and this is within the securable limit of A Company 1.

Now, supposing that the value of required security for any company exceeds its previously registered securable limit, the company will become unable to pay on the settlement day. In this case, the whole or part of the sum payable by that company to another, which is its direct trade partner, will be removed from the coverage of multilateral setoffs, but be settled by a bilateral setoff at the fourth stage 6d to be described later. For example, if the securable limit of A Company 1 is ¥1 million, the ¥1.3 million due from this company will exceed its securable limit, and its payables will be settled by multilateral setoffs only to the extent within its securable limit, by settling only the ¥100,000 due to B Company 2 to a multilateral setoff. Incidentally, in this case, the whole ¥1.2 million payable from A Company 1 to C Company 3 is to be settled by a bilateral setoff at the fourth stage 6d.

If the sum to be settled by every one of A Company 1 to D Company 4 is within the securable limit of the company, the scheduled plan of account settlements confirmed at the first stage 6a will be as illustrated in FIG. 10: namely ¥1.3 million payable by A Company 1, ¥600,000 receivable by B Company 2, ¥900,000 receivable by C Company 3, and ¥200,000 payable by D Company 4.

Then at the second stage 6b, the participants in the netting service including A Company 1, B Company 2, C Company 3 and D Company 4 deliver the required monetary securities to the netting service provider 5 in advance of the payment day (7b). By depositing the required monetary securities in advance, any subsequent change in the sum to be settled owing to the emergence of new payment information can be coped with because each participant in the netting service, if it has to pay additionally, only needs to make ready the fund for settlement by a bilateral setoff by the payment day or, if it is to receive an extra sum, need not raise any additional fund, so that there is no fear of settlement being disturbed by any contingency beyond the control of any party directly involved in the pertinent transaction.

Incidentally, to be specific, the delivery of these required monetary securities is accomplished through the fund transfer means provided by the financial institution (7e).

After the completion of processing at the second stage 6b in this manner, the netting service provider 5 checks, using the means provided by the financial institution, whether or not the participants in the netting service duly provided the required securities (transferred the sums due) at the second stage 6b through the financial institution (7f).

Figure 2:
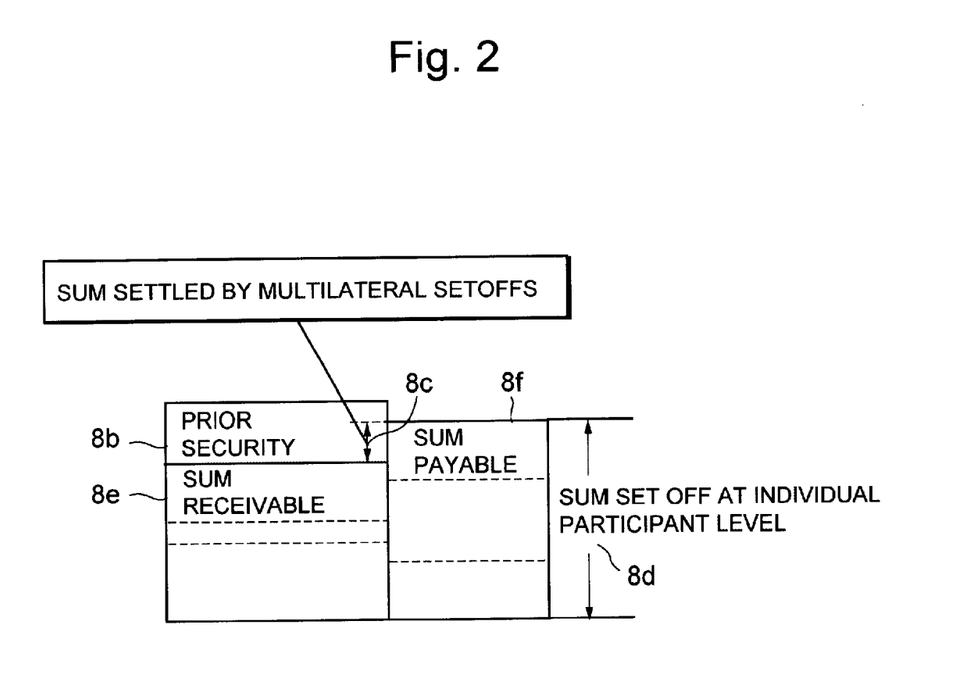
FIG. 2 is a diagram to be referred to in describing the processing in the first embodiment to determine the sum to be settled.

Next at the third stage 6c, the netting service provider 5 finalizes the sum to be settled by each of the netting service participants including A Company 1, B Company 2, C Company 3 and D Company 4 by multilateral setoffs so that it may not exceed the value of the security it has deposited. Processing of multilateral setoffs within the extent of the previously deposited securities is illustrated in FIG. 2. As shown in FIG. 2, if the debit (sum payable to other companies) 8f of a company surpasses its credit (sum receivable from other companies) 8e, the difference between the debit 8f and the credit 8e is calculated, and this difference, if it is within the secured sum 8b, is made the after-multilateral setoff settlement sum 8a.

To add, if the sum to be settled by any company exceeds the monetary security it deposited in advance, the whole or part of the sum payable from that company to its direct trade partner(s) will be settled not by multilateral setting off but by bilateral setting off at the fourth stage 6b to be described later.

Next in the procedure at the fourth stage 6d, the netting service provider 5, in accordance with the multilateral offsets at the preceding third stage 6c, delivers an equivalent (in cash) of the after-multilateral setoff settlement sum to each netting service participant whose after-multilateral setoff settlement sum is plus (receivable) (7d).

Further, any payment which was not multilaterally set off at the first stage 6a or the third stage 6c is settled by bilateral setting off (7g). Thus, by having netting service participants settle their remaining accounts by bilateral setoffs between them on the settlement day, the processing of account settlements among all the netting service participants is completed by the settlement time.

In the above-described manner, accounts to be settled by bilateral setting off are identified by the processing up to the third stage 6c, and the financial institution supplies each company with information on settlement by bilateral setting off (7h). Or the sums to be settled by multilateral setting off are finalized at the third stage 6c, and the financial institution processes the delivery of the applicable sums from the netting service provider 5 to netting service participants (7i).

Between netting service participants whose accounts have to be settled by bilateral setting off, even if insolvency occurs, only the direct trade partner(s) of the insolvent will be affected, resulting in an evident ascription of responsibility.

As described above, in the first embodiment of the invention described, participants in a netting service are required to deposit securities with the provider of the service in advance, accounts are settled by multilateral setoffs within the coverage of the securities, and accounts in excess of the sum the securities can cover are settled by bilateral setoffs so that, even if any participant in the netting service goes insolvent, the impact of the insolvency can be prevented from reaching all the participants in the service, and accordingly the ascription of responsibility can be clearly defined in this netting service arrangement.

Any participant in the netting service failing to deposit its security by the time specified by the provider of the service is subject to settlement by bilateral setting off, resulting in the additional advantage of easier management of securities.

Second Preferred Embodiment

However, in the first preferred embodiment described above, in which information on payment from a buyer to a seller is received by a third party netting service provider 5, who processes setoffs on the basis of this payment information, if either the buyer or the seller denies the payment information, there will arise the problem that records kept by the netting service provider 5 alone cannot technically endorse the existence of this payment information, and accordingly cannot demonstrate the legitimacy of its processing.

In view of this problem, the second preferred embodiment of the present invention to be described below has a configuration which would enable the netting service provider to demonstrate the legitimacy of its processing even if the buyer and seller deny the existence of payment information.

This second embodiment of the invention will be described below with reference to drawings.

In this embodiment too, as in the first embodiment described above, accounts among participants in a netting service are settled through an intervening netting service provider 5. This embodiment includes as one of its constituents an electronic notarial institution in addition to participants in and a provider of a netting service.

The "electronic notarial institution" here has a function to confirm payment information exchanged between buyers and sellers and to provide the confirmation obtained to another institution. Payment information confirmed by this electronic notarial institution will be hereinafter referred to as "confirmed payment information."

Figure 4:
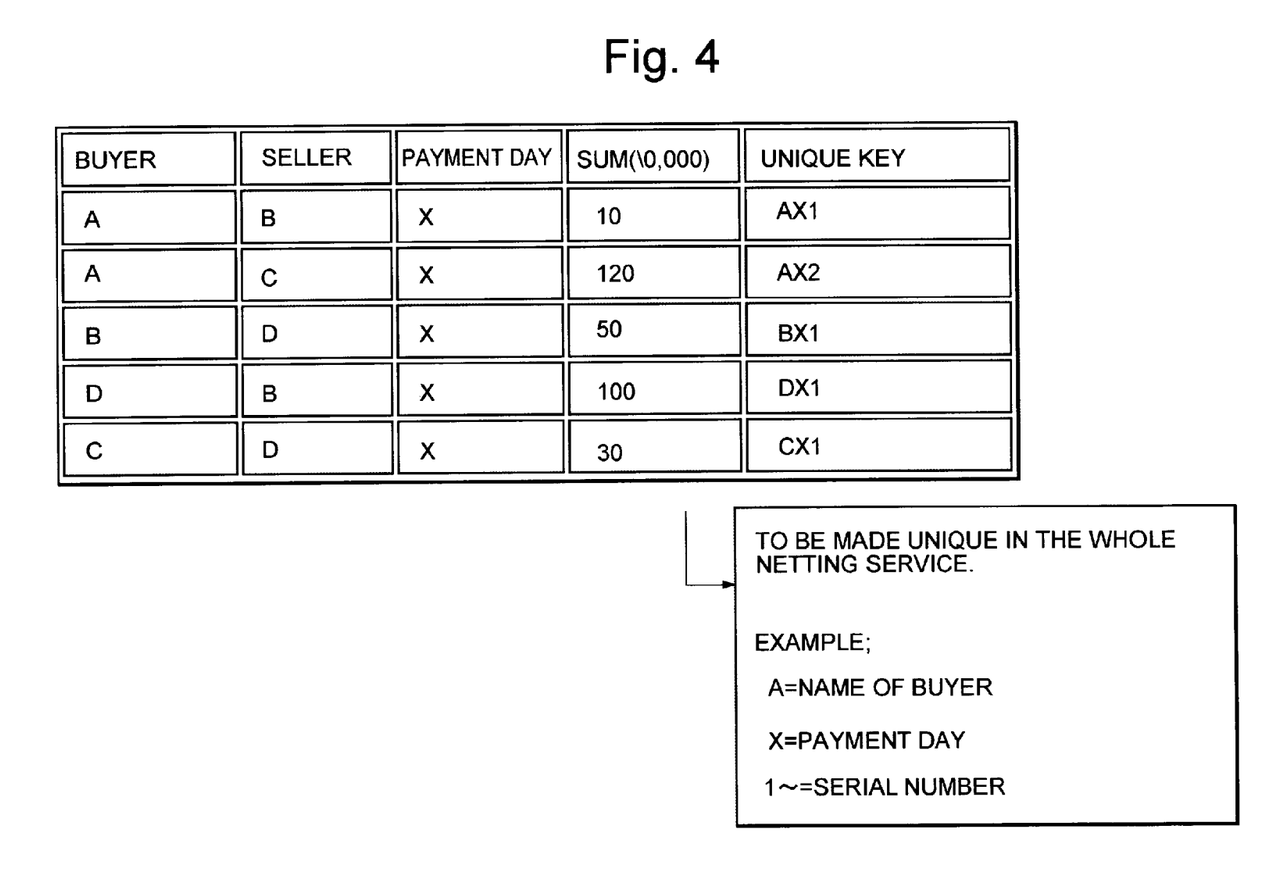
FIG. 4 is a chart showing the items of payment information in the second embodiment of the invention.

FIG. 4 shows the items of the payment information mentioned above. While payment information in the above-described first embodiment consists of the buyer, the seller, the payment day and the sum, these items alone are not sufficient, if a plurality of sets of payment information generate between the same buyer and seller for the same sum payable on the same day, to distinguish these different sets of payment information from each other. In view of this problem, in this embodiment, a serial number is assigned to payment information on the same buyer with the same due date, and by providing a unique key combining the buyer's name, payment day and serial number, each set of payment information is made to be unique in the whole netting service arrangement.

Next will be described this embodiment more specifically with reference to FIG. 3. In this FIG. 3, arrows with solid and broken stems respectively represent the directions and steps of processing, each of the latter being denoted by a reference sign beginning with "S" standing for step.

First a buyer 11, who is a participant in the netting service, generates encrypted payment information 15 by encrypting payment information 12 with a cipher key K (hereinafter referred to as "common key K") commonly held by the buyer 11, a seller 13 and the netting service provider 14 (step S1).

This encrypted payment information 15 is transmitted from the buyer 11 to an electronic notarial institution 16 (step S2).

Upon receiving this encrypted payment information 15, the electronic notarial institution 16 stores it into its own memory.

The buyer 11 also transmits the payment information 12 to the netting service provider 14 (step S3), who, upon receiving this payment information 12, stores it into its own memory.

The netting service provider 14 transmits this payment information 12 to the seller 13 (step S4).

Upon receiving this payment information 12, the seller 13 encrypts the payment information with the common key K, and thereby generates encrypted payment information 17 (step S5).

This encrypted payment information 17 is transmitted from the seller 13 to the electronic notarial institution 16 (step S6).

The electronic notarial institution 16, upon receiving the encrypted payment information 17 transmitted from the seller 13, references this encrypted payment information 17 (step S7) to find, out of the encrypted payment information 15 earlier received from the buyer 11 and stored, a set of the same contents as the encrypted payment information 17 (step S8), pairs the encrypted payment information 17 and the encrypted payment information 15, marks the pair with a time stamp, and stores it in its own memory as confirmed payment information 18. Confirmation is processed in this manner.

Next, the netting service provider 14, when the day of setoff processing (hereinafter sometimes referred to as netting procedure) arrives, reads out those sets of payment information 12, out of those previously stored in its own memory, whose due date is this setoff processing day (step S9), and reads out of the electronic notarial institution 16 the sets of confirmed payment information 18 corresponding to these sets of payment information 12 which have been read (step S10). Incidentally, as the key to this reading of confirmed payment information 18 out of the electronic notarial institution 16, the aforementioned unique key can be used.

The netting service provider 14 decrypts with the common key K the read sets of confirmed payment information 18, and performs counterchecking 19 to see if the payment information contained therein is identical with the matching payment information 12 stored in its own memory.

The netting service provider 14 subjects only those sets of payment information whose legitimacy has been endorsed by counterchecking to the netting procedure 20 (step S11).

Thus, this example of the second embodiment of the invention does not allow the electronic notarial institution 16 to tamper with any payment information 12 because it does not have the common key K.

If the buyer 11 alone denies the existence of any payment information, the confirmed payment information 18 stored in the electronic notarial institution 16 and the encrypted payment information 17 held by the seller 13 can prove the existence of the payment information at issue.

Or if the seller 13 alone denies the existence of any payment information, the confirmed payment information 18 stored in the electronic notarial institution 16 can endorse the existence of the payment information in question.

Furthermore if both the buyer 11 and the seller 13 deny the existence of any payment information, the confirmed payment information 18 held by the electronic notarial institution 16 and the payment information 12 held by the netting service provider 14 can demonstrate the existence of the pertinent payment information.

Therefore, even if either or both of the buyer 11 and the seller 13 deny the existence of any payment information after the netting procedure 20, the netting service provider 14 can technically endorse the legitimacy of its processing by the strength of the confirmed payment information 18 acquired by the electronic notarial institution 16.

Next will be described a second example of this second embodiment of the invention.

Figure 3:
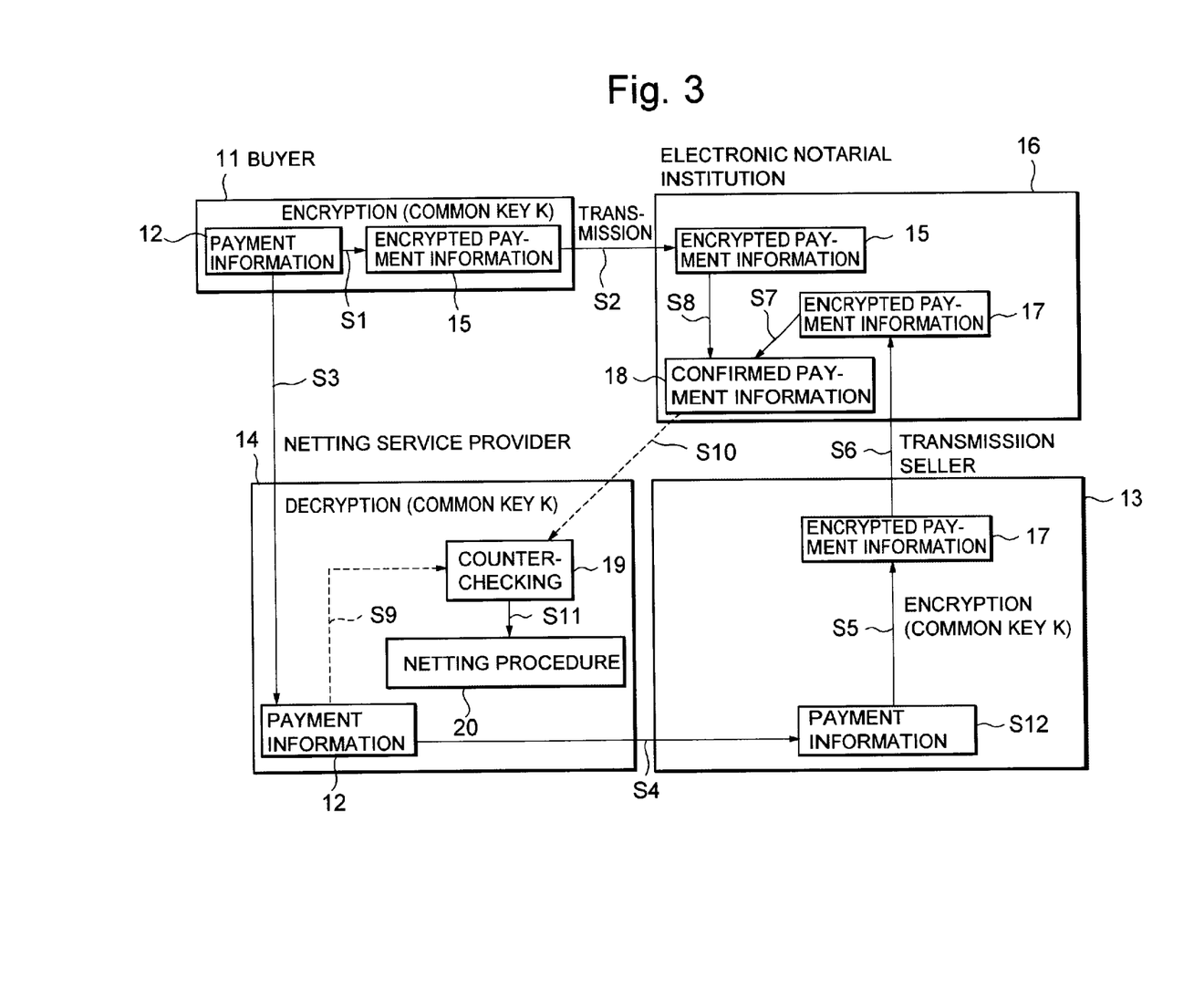
FIG. 3 is a block diagram illustrating the overall configuration of a first example of a second preferred embodiment of the invention.
Figure 5:
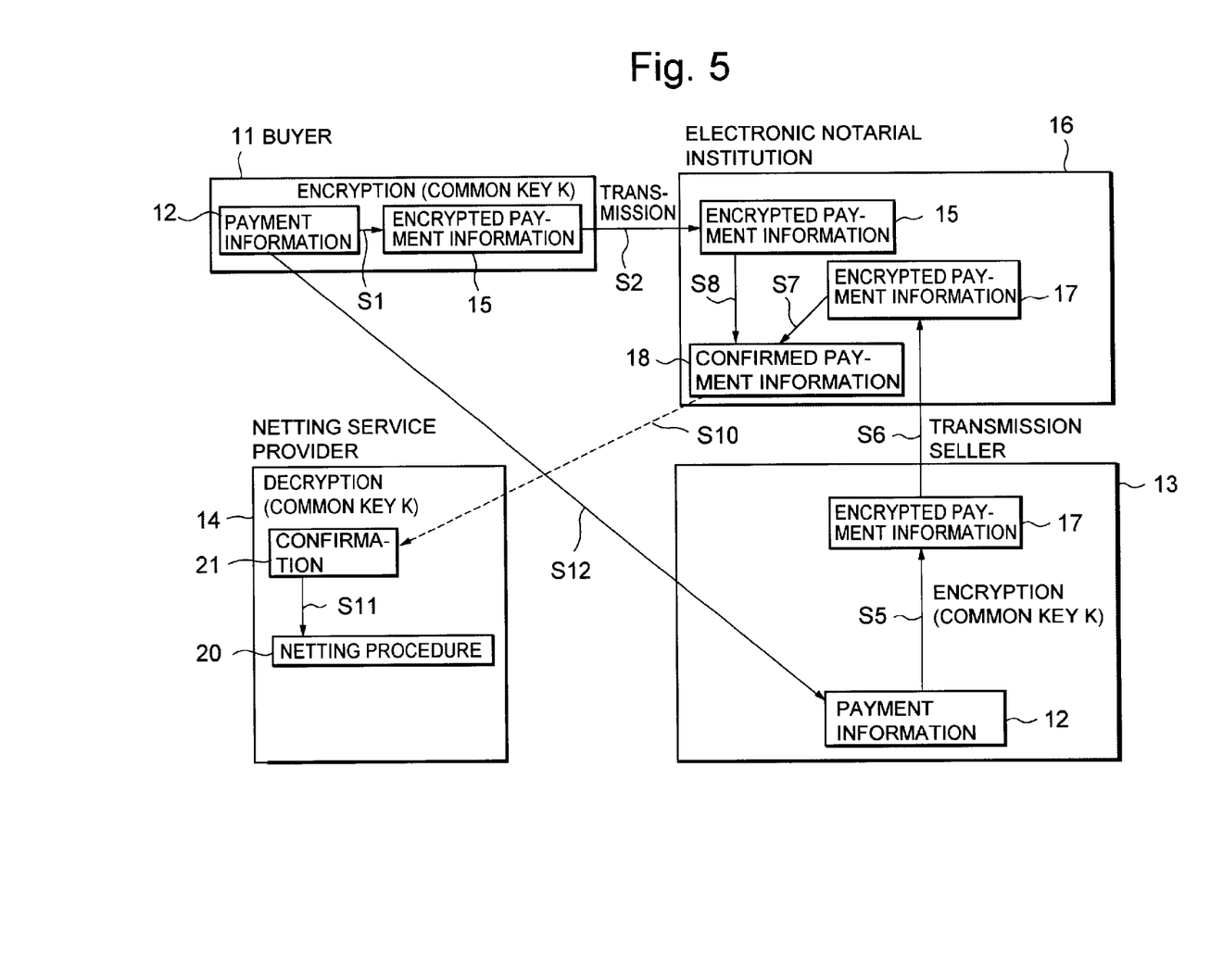
FIG. 5 is a block diagram illustrating the overall configuration of a second example of a second preferred embodiment of the invention.

FIG. 5 is a block diagram illustrating the overall configuration of this example, wherein those parts having either exact or substantial counterparts in FIG. 3 are assigned the same reference signs.

In this example shown in FIG. 5, the buyer 11 encrypts payment information 12 with the common key K to generate encrypted payment information 15 (step S1).

This encrypted payment information 15 is transmitted from the buyer 11 to the electronic notarial institution 16 (step S2).

Upon receiving this encrypted payment information 15, the electronic notarial institution 16 stores it into its own memory.

The buyer 11 also transmits the payment information 12 to the seller 13 (step S12), who, upon receiving this payment information 12, stores it into its own memory, and encrypts it with the common key K to generate encrypted payment information 17 (step S5).

This encrypted payment information 17 is transmitted from the seller 13 to the electronic notarial institution 16 (step S6).

The electronic notarial institution 16, upon receiving the encrypted payment information 17 from the seller 13, references this encrypted payment information 17 (step S7) to find, out of the encrypted payment information 15 earlier received from the buyer 11 and stored, a set of the same contents as the encrypted payment information 17 (step S8), pairs the encrypted payment information 17 and the encrypted payment information 15, marks the pair with a time stamp, and stores it in its own memory as confirmed payment information 18. Confirmation is processed in this manner.

Next, the electronic notarial institution 16 transmits the confirmed payment information 18 to the netting service provider 14 (step S10), who performs confirmation 21 by decrypting this confirmed payment information 18 with the common key K and storing the decrypted payment information in its own memory.

The netting service provider 14 judges from the payment day stated in the payment information 12 when to process netting, and when the time comes, reads the stored payment information 12 and performs the netting procedure 20.

In this example of the second embodiment either, the electronic notarial institution 16 cannot tamper with any payment information 12 because it does not have the common key K.

If the buyer 11 alone denies the existence of any payment information, the confirmed payment information 18 stored in the electronic notarial institution 16 and the encrypted payment information 17 held by the seller 13 can prove the existence of the payment information at issue.

Or if the seller 13 alone denies the existence of any payment information, the confirmed payment information 18 stored in the electronic notarial institution 16 and the encrypted payment information 15 held by the buyer 11 can endorse the existence of the payment information in question.

Furthermore if both the buyer 11 and the seller 13 deny the existence of any payment information, the confirmed payment information 18 held by the electronic notarial institution 16 can demonstrate the existence of the pertinent payment information.

Therefore, even if either or both of the buyer 11 and the seller 13 deny the existence of any payment information after the netting procedure 20, the netting service provider 14 can technically endorse the legitimacy of its processing by the strength of the evidence acquired by the electronic notarial institution 16.

Figure 6:
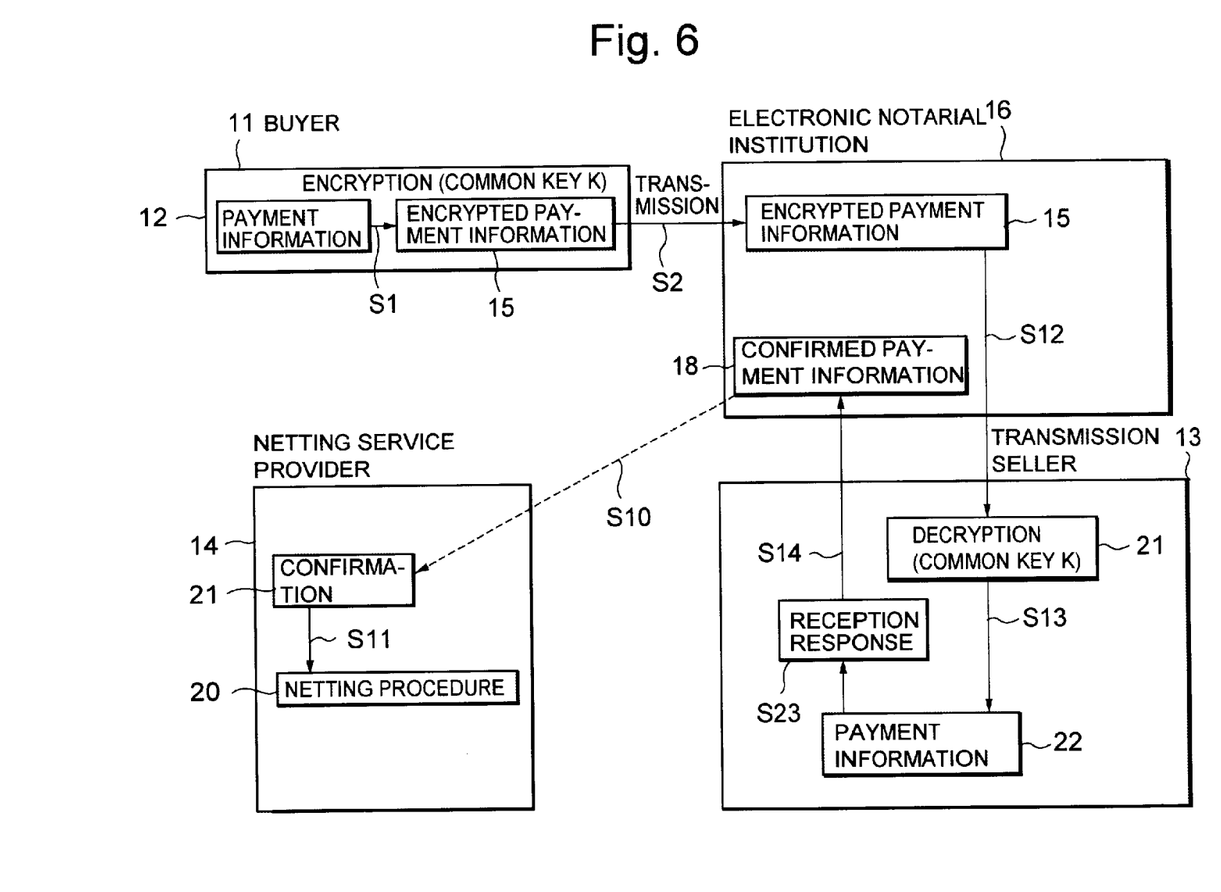
FIG. 6 is a block diagram illustrating the overall configuration of a third example of a second preferred embodiment of the invention.

Next will be described a third example of this second embodiment of the invention. FIG. 6 is a block diagram illustrating the overall configuration of this third example, wherein those parts having either exact or substantial counterparts in FIGS. 3 and/or 5 are assigned the same reference signs.

In this example shown in FIG. 6, the buyer 11 encrypts payment information 12 with the common key K to generate encrypted payment information 15 (step S1).

This encrypted payment information 15 is transmitted from the buyer 11 to the electronic notarial institution 16 (step S2).

Upon receiving the encrypted payment information 15, the electronic notarial institution 16 stores it into its own memory. The electronic notarial institution 16 also transmits to this encrypted payment information 15 to the seller 13 (step S12).

The seller 13, upon receiving the encrypted payment information 15, performs decryption processing 21 on it with the common key K to acquire payment information 22 (step S13).

The seller 13 transmits to the electronic notarial institution 16 a reception response 23 indicating its receipt of payment information (step S14).

The electronic notarial institution 16, upon receiving this reception response 23, generates confirmed payment information 18 by marking it with a time stamp, and stores it in its own memory. Confirmation is processed in this manner.

Next, the electronic notarial institution 16 transmits the confirmed payment information 18 to the netting service provider 14 (step S10), who decrypts this confirmed payment information 18 with the common key K and stores the payment information.

The netting service provider 14 judges from the payment day stated in the payment information when to process netting, and when the time comes, reads the payment information stored in its own memory, performs confirmation 21 and then the netting procedure 20 (step S11).

In this example of the second embodiment either, the electronic notarial institution 16 cannot tamper with any encrypted payment information 15 because it does not have the common key K.

If the buyer 11 alone denies the existence of any payment information, the encrypted payment information 15 stored in the electronic notarial institution 16 and the payment information 22, decrypted from the encrypted payment information held by the seller 13, can prove the existence of the payment information at issue.

Or if the seller 13 alone denies the existence of any payment information, the encrypted payment information 15 stored in the electronic notarial institution 16 and the encrypted payment information 15 held by the buyer 11 can endorse the existence of the payment information in question.

On top of that, if both the buyer 11 and the seller 13 deny the existence of any payment information, the confirmed payment information 18 held by the electronic notarial institution 16 can demonstrate the existence of the pertinent payment information.

Therefore, even if either or both of the buyer 11 and the seller 13 deny the existence of any payment information after the netting procedure 20, the netting service provider can technically endorse the legitimacy of its processing by the strength of the evidence acquired by the electronic notarial institution 16.

Third Preferred Embodiment

Incidentally, since all the companies participating in the netting service, even if they differ from one another in creditability, are equally treated in multilateral setoffs in the above-described first and second embodiments of the invention, there still remains the problem that insolvency of any company would affect all the other participants in the netting service. Thus, in neither of these embodiments, the plurality of companies participating in the netting service are divided into groups by industry or any other criterion, so that the impact of insolvency of any participating company could not be confined to the group the insolvent company belongs to.

A third preferred embodiment of the present invention, which is intended to solve this problem, will be described below with reference to drawings.

Figure 7:
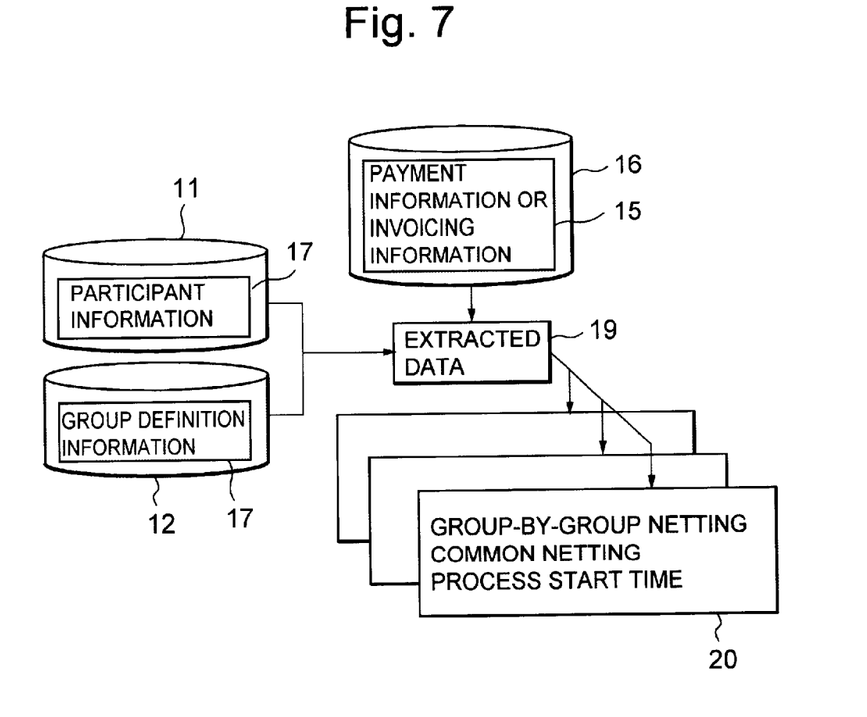
FIG. 7 is a block diagram illustrating the overall configuration of a third preferred embodiment of the invention.

FIG. 7 is a diagram for describing the processing from the starting time of the netting procedure onward.

In this embodiment, a plurality of netting service participants are divided into groups by criteria reflecting creditability and reliability, and the netting system and the deadline for data acceptance are separately set for each group, so that the netting service can confine the impact of insolvency of any netting service participant within the group.

Before starting the processing in this embodiment, information on each netting service participant is first registered into a database 11 in a system belonging to the netting service provider. Specifically, the registered items include the following.

(1) Name of the participating company;
(2) Code of the participating company;
(3) Netting system;
(4) Name of the group the company belongs to, and
(5) Code of the group.

For (3) Netting system here, each participating company can choose one out of three options: (a) bilateral setoff, (b) multilateral setoff, and (c) no setoff. As regards (4) Name of the group the company belongs to and (5) Code of the group, companies subject to the netting procedure are divided into groups, with the benefits and risks of netting taking into consideration, information on the group to which each company belongs as a result is entered under these headings.

Then, regarding the group, information on its definition is registered into a database 12. Specifically, the registered items include the following.

(1) Name of the group;
(2) Code of the group;
(3) Name of the host;
(4) Code of the host;
(5) Netting system;
(6) Class of extra-group netting, and
(7) Bank of settlement.

To add, (5) Netting system designates the method of netting (setting off) with extra-group participants for the whole group. Each group can choose one of three options: (A) having no host, (B) having a host and extra-group bilateral setoffs, and (C) having a host but no extra-group bilateral setoff.

Figure 8:
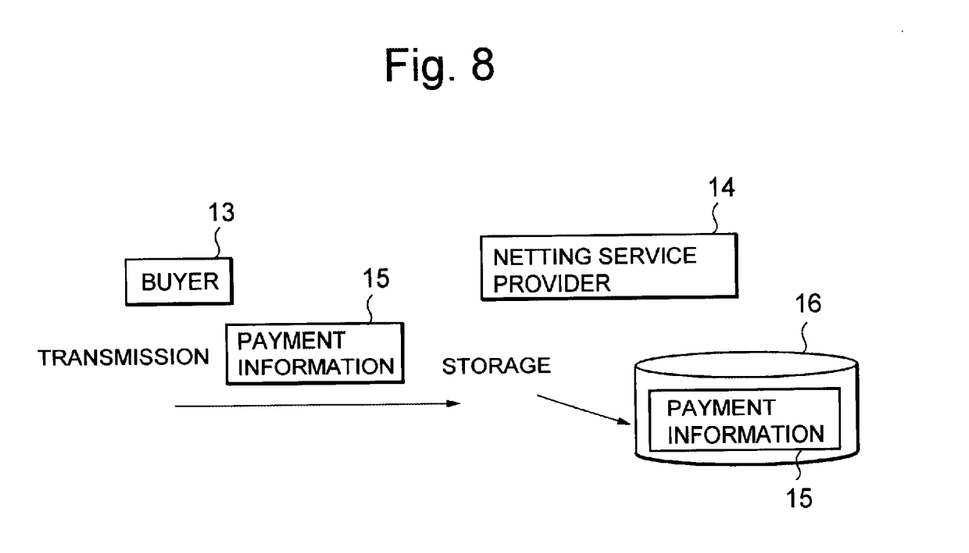
FIG. 8 is a diagram to be referred to in describing the processing in the third embodiment.

The operation of this embodiment will be described next. As illustrated in FIG. 8, the buyer 13 participating in the netting service transmits to the netting service provider 14 payment information or invoicing information 15 including "buyer," "seller," "payment day," "currency" and "sum" by the deadline for data acceptance.

The netting service provider 14, upon receiving the payment information 15, stores the received payment information 15 into a payment information database 16.

If invoicing information is received, the netting service provider 14 also stores, though not shown, stores the invoicing information into an invoicing information database in a similar manner.

Then the netting service provider 14, when a netting procedure starting time 20 comes, extracts data matching that netting procedure starting time out of participating company information 17 registered in the database 11 within the netting service provider's system, group definition information 18 registered in the database 12 within the netting service provider's system, payment information registered in the payment information database 16 or invoicing information registered in the invoicing information database.

Next, with the "netting system" in the group definition information 18 and the "netting system" in the participating company information 17 referenced, the netting procedure is carried out.

There are three options for the "netting system" in the group definition information 18: (a) multilateral setting off, (b) bilateral setting off, and (c) no setting off. Each of them will also be explained item by item.

In the Case of (A) Having No Host:

(a) Multilateral Setting Off:

Within a group, payables and receivables are multilaterally set off. Thus, the difference between the sum payable by each company to others in the same group and the sum receivable by the former from the latter is the sum to be settled by that company within the group.

(b) Bilateral Setting Off:

Within a group, payables and receivables are bilaterally set off. Thus, the difference between the sum payable by each company to each of its direct trade partners in the same group and the sum receivable by the former from the latter is the sum to be settled by that company within the group.

(c) No Setting Off:

Within the group, the sum payable by each company to its direct trade partners in the same group is the sum to be settled by that company within the group.

In none of these instances under (A), nothing is set off with companies outside the group.

In the Case of (B) Having a Host and Extra-group Bilateral Setoffs:

(a) Multilateral Setting Off:

Within a group, payables and receivables are multilaterally set off. Thus, the difference between the sum payable by each company to others in the same group and the sum receivable by the former from the latter is the sum to be settled by that company within the group.

In addition to that, payables to and receivables from companies outside the group are bilaterally set off. Thus, the difference between the sum payable by each company to each of its direct trade partners outside the group and the sum receivable by the former from the latter is the sum to be settled by that company with extra-group companies.

(b) Bilateral Setting Off:

Within a group, payables and receivables are bilaterally set off. Thus, the difference between the sum payable by each company to each of its direct trade partners in the same group and the sum receivable by the former from the latter is the sum to be settled by that company within the group.

In addition to that, payables to and receivables from companies outside the group are bilaterally set off. Thus, the difference between the sum payable by each company to each of its direct trade partners outside the group and the sum receivable by the former from the latter is the sum to be settled by that company with extra-group companies.

(c) No Setting Off:

Within the group, the sum payable by each company to its direct trade partners in the same group is the sum to be settled by that company within the group.

In addition to that, payables to and receivables from companies outside the group are bilaterally set off. Thus, the difference between the sum payable by each company to each of its direct trade partners outside the group and the sum receivable by the former from the latter is the sum to be settled by that company with extra-group companies.

Incidentally, under (B), the host company totals the sums to be settled between companies in the group and companies outside the group in addition to (a) through (c) above, and the resultant total sum to be settled is made the sum payable to the host company of the other group those extra-group companies belong to.

In the Case of (C) Having a Host but No Extra-group Bilateral Setoff:

(a) Multilateral Setting Off:

Within a group, payables and receivables are multilaterally set off. Thus, the difference between the sum payable by each company to others in the same group and the sum receivable by the former from the latter is the sum to be settled by that company within the group.

In addition to that, with companies outside the group, the sum payable by each company to its direct trade partners outside the group is the sum to be settled by that company with extra-group companies.

(b) Bilateral Setting Off:

Within a group, payables and receivables are bilaterally set off. Thus, the difference between the sum payable by each company to each of its direct trade partners in the same group and the sum receivable by the former from the latter is the sum to be settled by that company within the group.

In addition to that, with companies outside the group, the sum payable by each company to its direct trade partners outside the group is the sum to be settled by that company with extra-group companies.

(c) No Setting Off:

Within the group, the sum payable by each company to its direct trade partners in the same group is the sum to be settled by that company within the group.

In addition to that, with companies outside the group, the sum payable by each company to its direct trade partners outside the group is the sum to be settled by that company with extra-group companies.

Incidentally, under (C), the host company totals the sums to be settled between companies in the group and companies outside the group in addition to (a) through (c) above, and the resultant total sum to be settled is made the sum payable to the host company of the other group those extra-group companies belong to.

As is evident from the foregoing description, this embodiment provides the advantage of confining the impact of the insolvency of any company within the group the insolvent company belongs to because it is made possible to set non-setting off with extra-group companies by designating "no host" in the system of netting with companies outside the group.

Furthermore, in bilateral settling off between the host company of one group with extra-group companies, even if the insolvent company is the host, the impact of insolvency, such as payment in arrears, can be confined within the same group and the host company of the other group with which setting off is done, or if the insolvent is any other company than the host, the impact can obviously be confined within the same group.

What is claimed is:

1. A method, for settling accounts among a plurality of participants, comprising:

dividing said plurality of participants into a plurality of groups; and setting for each of the plurality of groups as a netting system one of (A) having no host, (B) having a host and extra-group bilateral setoffs, and (C) having a host but no extra-group bilateral setoff wherein:

no setoff is made for a group, for which (A) is set as the netting system, between any participant in the group and any participant outside the group; the sums to be settled are determined by bilateral setoffs for a group, for which (B) is set as the netting system, between participants in the group and participants outside the group; and the sum to be paid by each participant is determined as it is to be the sum to be settled for a group, for which (C) is set as the netting system, between the participant in the group and any participant outside the group.

2. A method, as claimed in claim 1, wherein: delivery of sums settled between participants in a group and participants outside the group is accomplished by a participant who is a host of the group.

* * * * *